US012612247B2

(12) United States Patent
Howse

(10) Patent No.: US 12,612,247 B2
(45) Date of Patent: Apr. 28, 2026

(54) CONTAINER APPARATUS AND A CONTAINER MOUNTING COLLAR

(71) Applicant: BLUEWATER RISE INVESTMENTS LIMITED, Hamilton (NZ)

(72) Inventor: David Charles Howse, Hamilton (NZ)

(73) Assignee: BLUEWATER RISE INVESTMENTS LIMITED, Hamilton (NZ)

( * ) Notice: Subject to any disclaimer, the term of this patent is extended or adjusted under 35 U.S.C. 154(b) by 205 days.

(21) Appl. No.: 18/110,089

(22) Filed: Feb. 15, 2023

(65) Prior Publication Data

US 2023/0322481 A1 Oct. 12, 2023

Related U.S. Application Data

(62) Division of application No. 16/635,385, filed as application No. PCT/NZ2018/050140 on Oct. 12, 2018, now Pat. No. 11,691,811.

(30) Foreign Application Priority Data

Oct. 13, 2017 (NZ) ........................................ 736283
Oct. 13, 2017 (NZ) ........................................ 736290

(51) Int. Cl.
*B65F 1/16* (2006.01)
*A47B 77/18* (2006.01)
*B65F 1/14* (2006.01)

(52) U.S. Cl.
CPC .......... *B65F 1/1623* (2013.01); *B65F 1/1436* (2013.01); *A47B 77/18* (2013.01);
(Continued)

(58) Field of Classification Search
CPC B65F 1/1436; B65F 2001/1676; B65F 1/006; A47B 77/18; A47B 77/10
See application file for complete search history.

(56) References Cited

U.S. PATENT DOCUMENTS 3,528,718 A * 9/1970 Braun ........................ B65F 1/06 312/270.3
5,634,702 A 6/1997 Fistonich
(Continued)

FOREIGN PATENT DOCUMENTS

CN 210785134 U * 6/2020
DE 3631276 2/1988
(Continued)

OTHER PUBLICATIONS

Japan Official Action issued in JP Application No. 2020-541637, dated Mar. 23, 2023.
(Continued)

*Primary Examiner* — Hanh V Tran
(74) *Attorney, Agent, or Firm* — Greenblum & Bernstein, P.L.C.

(57) ABSTRACT

A collar for mounting a container between laterally spaced runners of a retractable container apparatus. The collar includes a body portion and two wing portions. The wing portions are provided to opposing lateral sides of the body. Each wing portion includes a snap fit connector configured to connect directly or indirectly to a respective runner in a snap fit connection. The body portion at least partly defines an opening configured, in use, to receive the container so that the container is supported between the runners.

16 Claims, 18 Drawing Sheets

(52) U.S. Cl.
CPC ..... *B65F 1/1615* (2013.01); *B65F 2001/1661* (2013.01); *B65F 2001/1669* (2013.01); *B65F 2001/1676* (2013.01)

(56) References Cited

U.S. PATENT DOCUMENTS

| | | | | |
|---|---|---|---|---|
| 6,224,176 | B1 | 5/2001 | Suzuki | |
| 7,370,919 | B2 * | 5/2008 | Rapier, III | A47B 88/427 312/308 |
| 7,607,444 | B2 | 10/2009 | Gunnerson et al. | |
| 8,201,570 | B2 | 6/2012 | Froelicher | |
| 9,049,930 | B1 * | 6/2015 | Chambers | A47B 77/18 |
| 2002/0024276 | A1 * | 2/2002 | Neuhaus | A47B 77/18 312/351.7 |
| 2007/0119485 | A1 | 5/2007 | Gunnerson et al. | |
| 2008/0007147 | A1 | 1/2008 | Skog | |
| 2009/0107998 | A1 * | 4/2009 | Meissen | B65F 1/1607 220/254.3 |
| 2011/0095029 | A1 | 4/2011 | Froelicher | |
| 2012/0294555 | A1 * | 11/2012 | Roeck | A47B 88/931 384/20 |
| 2015/0001219 | A1 * | 1/2015 | Hess | B65F 1/122 220/263 |
| 2015/0008813 | A1 * | 1/2015 | Braun | A47B 88/956 312/334.1 |

FOREIGN PATENT DOCUMENTS

| | | | | |
|---|---|---|---|---|
| DE | 9107138 | | 6/1991 | |
| DE | 9200360 | | 5/1993 | |
| DE | 9414004 | U1 * | 3/1995 | |
| DE | 19920388 | A1 * | 11/2000 | F16B 12/40 |
| DE | 202005016305 | U1 * | 10/2006 | A47B 77/18 |
| DE | 202005008286 | U1 * | 11/2006 | A47B 88/00 |
| DE | 20 2006 001 172 | | 4/2007 | |
| DE | 10 2012 103 103 | | 10/2013 | |
| DE | 202014102726 | U1 * | 10/2015 | A47B 77/18 |
| DE | 20 2015 100 485 | | 6/2016 | |
| DE | 202017102855 | U1 * | 10/2018 | |
| EP | 0 778 227 | | 6/1997 | |
| EP | 1136392 | | 7/2008 | |
| EP | 2801291 | A1 * | 11/2014 | A47B 77/18 |
| EP | 3 072 415 | | 9/2016 | |
| EP | 1790270 | | 5/2017 | |
| ES | 1059455 | U * | 4/2005 | |
| FR | 2477510 | | 9/1981 | |
| IT | BO20120007 | U1 * | 7/2013 | |
| JP | 2002-355132 | | 12/2002 | |
| JP | 2006-122566 | | 5/2006 | |
| JP | 2006271629 | A * | 10/2006 | |
| JP | 4182943 | B2 * | 11/2008 | |
| WO | WO-9207494 | A1 * | 5/1992 | A47B 77/18 |
| WO | WO-2006125630 | A1 * | 11/2006 | A47B 88/00 |
| WO | 2013/111123 | | 8/2013 | |

OTHER PUBLICATIONS

Extended European Search Report issued in EP Application No. 22216401.4, dated Jun. 16, 2023.
Korean Office Action issued in KR Application No. 10-2020-7004003, dated Jun. 7, 2023.
International Search Report issued in International Patent Application No. PCT/NZ2018/050140, dated Feb. 26, 2019.
International Preliminary Report on Patentability issued in International Application No. PCT/NZ2018/050140, dated Sep. 4, 2019.
Extended European Search Report received in Application No. 18866970.9, dated Feb. 1, 2021.

* cited by examiner

CONTAINER APPARATUS AND A CONTAINER MOUNTING COLLAR

CROSS-REFERENCE TO RELATED APPLICATIONS

This application is a Divisional of U.S. patent application Ser. No. 16/635,385, filed Jan. 30, 2020, which is a National Stage Entry of International Patent Application No. PCT/NZ2018/050140, filed Oct. 12, 2018, which claims the benefit of New Zealand Patent Application No. 736283, filed Oct. 13, 2017 and New Zealand Patent Application No. 736290, filed Oct. 13, 2017. The disclosure of each of the applications listed above is incorporated by reference herein in its entirety.

TECHNICAL FIELD

The present invention relates to a container apparatus, and in particular, but not exclusively, to a drawer type rubbish container apparatus, and to related components and apparatus including a collar for mounting the container in a retractable storage system.

BACKGROUND ART

Modern kitchen designs often feature a rubbish or waste container associated with a dedicated sliding drawer mechanism.

Some versions of these drawers provide a lid for the container which engages the top of the container when the drawer is closed, thereby reducing odours and keeping insects and other pests out of the container.

A problem facing designers of such system is how to provide a mechanism that allows the user to avoid the need to manually remove the lid from the container in order to place waste in the container.

A further problem facing designers of such systems is how to provide a mechanism which automatically closes the lid on the container without creating excess friction between the lid and the container when the container/drawer is being slid open for use. Friction between the lid and the container can inhibit the smooth easy closing of the drawer.

It is also desirable for all parts of such a drawer and lid combination to be able to be disassembled for cleaning or maintenance.

These containers are mounted on a framework of the sliding mechanisms. The framework or other parts of the sliding mechanisms may accumulate dirt and be difficult to clean and/or difficult to remove for cleaning. The accumulation of dirt may be generally undesirable and may be a hygiene hazard.

It is therefore desirable to mount a container in a retractable drawer mechanism in such a way as to hinder the accumulation of dirt and/or to enable easy or ready cleaning of the container system.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art, in New Zealand or in any other country.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

It is an object of the present invention to address the foregoing problems or at least to provide the public with a useful choice.

Further aspects and advantages of the present invention will become apparent from the ensuing description which is given by way of example only.

DISCLOSURE OF THE INVENTION

According to one aspect of the present invention there is provided a container apparatus comprising mounting means, a lid connected to the mounting means by connecting means, and a frame slideably connected to the mounting means, the frame adapted to support a waste container, wherein the frame is slideable between a first frame position, wherein an open end of the waste container is entirely covered by the lid, and a second frame position which is offset from the first position in a first direction, the connecting means arranged to allow the lid to move between a first lid position, wherein the lid covers the open end of the waste container when the frame is in the first frame position, and a second lid position which is above the first lid position and is offset from the first lid position in a direction parallel to the first direction, wherein there is no contact between the lid and the waste container or the frame when the lid is in the second position, the apparatus further comprising lid moving means configured to move the lid to the second lid position when the frame is moved from the first frame position to the second frame position.

Preferably the second lid position is offset from the first lid position in a direction which is opposite the first direction.

Preferably the connecting means comprise at least two arms which are rotatably connected to the mounting means.

Preferably the connecting means are rotatably connected to an upper wall of the mounting means.

Alternatively, each connecting means may be rotatably connected to a side wall of the mounting means.

Preferably the connecting means comprises at least a first arm and a second arm, wherein the first arm is spaced apart from the second arm in the first direction.

Preferably the arms and the lid form at least one parallelogram linkage.

Preferably the lid is releasably connectable to the connecting means.

Preferably the lid is provided with hook means which releasably connect the lid to the connecting means.

According to a second aspect of the present invention there is provided a lid moving means for use with a container apparatus, the container apparatus comprising mounting means, a lid connected to the mounting means by connecting means, and a frame slideably connected to the mounting means, the frame adapted to support a waste container, wherein the frame is slideable between a first frame position, wherein an open end of the container is entirely covered by the lid, and a second frame position which is offset from the first position in a first direction, the lid moving means comprising a base and an actuation means comprising a lid engaging means configured to abut the lid in use, the actuation means moveable relative to the base between a first actuation means position and a second actuation means position which is offset from the first actuation means position, the lid moving means further comprising frame position detecting means for detecting, in use, when the frame moves from the first frame position to the second frame position, wherein, in use, the actuation means moves to the second actuation means position when the frame position detecting means detects that the frame has moved from the first frame position to the second frame position.

Preferably the frame position detecting means comprises an abutment member which is moveable relative to the base by the frame when the frame moves from the second position to the first position. Alternatively, the frame position detecting means comprises a sensor.

Preferably the lid moving means comprises transmission means configured to cause movement of the actuation means relative to the base when the abutment member moves relative to the base.

Preferably the transmission means comprises a transmission member having a first end engaged with the abutment member and a second end engaged with the actuation means, the transmission member connected to the base by a rotatable connection provided intermediate the first and second ends.

Preferably the actuation means is biased towards the second actuation means position.

Preferably, movement of the actuation means between the first actuation means position and the second actuation means position causes movement of the lid engaging means along a first axis between a first lid engaging means position and a second lid engaging means position, wherein the lid engaging means is moveable to a third lid engaging means position which is offset from the first axis.

Preferably movement of the actuation means to a third actuation means position causes movement of the lid engaging means to the third lid engaging means position.

According to a third aspect of the present invention there is provided a lid moving means comprising a housing, an actuation means slideably engaged with the housing and comprising a lid engaging means, an abutment means slideably engaged with the housing, and transmission means engaged with the abutment means and the actuation means and configured such that movement of the abutment means causes movement of the actuation means, wherein the actuation means is moveable relative to the housing between a first actuation means position and a second actuation means position which is offset from the first actuation means position, the lid engaging means arranged to protrude from a plane of a first surface of the housing when the actuation means is in the first actuation means position and the second actuation means position, to abut the lid in use, wherein the actuation means is moveable to a third actuation means position wherein, when in the third actuation means position, a distance which the lid engaging means protrudes from the plane of the first surface of the housing is less than the distance the lid engaging means protrudes when the first actuation means is in the first actuation means position or the second actuation means position.

Preferably the first actuation means position is between the second actuation means position and the third actuation means position.

Preferably the actuation means comprises a first actuation member, wherein the lid engaging means is rotatably connected to the first actuation member.

Preferably movement of the actuation means to the third actuation means position causes rotation of the lid engaging means relative to the first actuation member.

Preferably the abutment means has a normal configuration and an extended configuration.

Preferably the abutment means comprises an inner member and an outer sleeve which is rotatably connectable to the inner member.

Preferably the inner member is provided with a tab which protrudes from an outer surface thereof, and the outer sleeve is provided with a slot configured to receive the tab.

Preferably the slot has a first portion which extends substantially longitudinally along the sleeve and a second portion which extends substantially transversely to the first portion.

Preferably, the transmission means comprises a transmission member having a first end engaged with the abutment means and a second end engaged with the actuation means, the transmission member connected to the housing by a rotatable connection provided intermediate the first and second ends.

According to a fourth aspect of the present invention there is provided a kit of parts for a container apparatus comprising a lid moving means according to the second aspect or the third aspect, a lid, and connecting means adapted to connect the lid to a mounting means such that, in use, the lid is moveable between a first lid position and a second lid position which is above the first lid position and is offset laterally from the first lid position.

According to fifth aspect of the present invention there is provided a container apparatus substantially as herein described with reference to the accompanying drawings.

According to a sixth aspect of the invention there is provided a lid moving means substantially as herein described with reference to the FIGS. 3-11.

According to seventh aspect of the invention, there is provided a collar for mounting a container between laterally spaced runners of a retractable container apparatus, the collar comprising:

a body portion; and two wing portions, each wing portion being provided to opposing lateral sides of the body, each wing portion comprising a snap fit connector configured to connect directly or indirectly to the runners in a snap fit connection, wherein the body portion at least partly defines an opening configured, in use, to receive the container so that the container is supported between the runners.

Preferably, at least one of the wing portions partially defines the opening.

Preferably, the snap fit connector of each wing portion is provided on an outer lateral surface of the wing portion.

Preferably, when the container is received by the opening, inward movement of the snap fit connectors is substantially inhibited.

In an alternative embodiment, the opening is sized relative to the container so that, when the container is received by the opening, the snap fit connectors are urged in an outward lateral direction. More preferably, deformation of the body portion causes the snap fit connectors to be urged in the outward lateral direction.

Preferably the collar comprises a first projection, the first projection projecting from the body portion into the opening on a first lateral side of the opening. More preferably, the collar comprises a second projection, the second projection projecting from the body portion into the opening on a second lateral side of the opening, the second lateral side of the opening opposing the first lateral side of the opening.

In a preferred embodiment of the invention the wing portions comprise cover portions configured to substantially cover at least a part of the runners when the collar is connected to the runners.

Preferably, the cover portions comprise substantially planar surfaces which face upwards when in use.

Preferably, the collar comprises at least one ridge which in use projects upwardly from the body portion on at least one side of the opening.

In an alternative embodiment, the collar comprises one or more collar opening recesses on the body portion around the opening.

According to an eighth aspect of the invention there is provided a container apparatus comprising:

- two laterally spaced runners configured to be mounted in a cavity;
- a collar according to the seventh aspect of the invention;
- a container configured, in use, to be received by the collar; and
- a mounting means for mounting the container apparatus.

According to a ninth aspect of the present invention there is provided a collar comprising an opening adapted to support a container, wherein the collar is adapted to fit between two runners of a retractable container apparatus and, when so fitted, to cover at least a part of the runners, the collar comprising a snap fit connector configured to securely and removably connect the collar directly or indirectly to the runners in a snap fit connection.

Preferably the collar further comprises one or more projections provided on an inner surface of the collar which forms at least a part of the opening, wherein, when the container is supported by the collar, the projections are contacted by the sides of the container, such that inward movement of the snap fit connector is substantially inhibited.

In an alternative embodiment, when the container is supported by the collar, the projections are contacted by the sides of the container so that the container pushes respective portions of the collar horizontally outwards to enhance the snap fit connection.

Preferably a cover member is provided along each of the runners, wherein the cover member is configured to cover runner members of the respective runners. More preferably the cover members provide a smooth surface which is easy to clean.

Preferably the snap fit connector comprises a protrusion on an outer surface of the collar which is adapted to snap fit into a complementary groove on one of the cover members.

Preferably the projections are sized and positioned in order that the waste container can easily be inserted and removed from the collar.

Preferably the projections are positioned on the outer surface of the collar adjacent to the runners.

Preferably the collar comprises one or more raised edges around the opening, wherein the raised edges are adapted to hold the container securely in place.

In an alternative embodiment, the collar comprises one or more collar opening recesses around the opening, wherein the collar opening recesses are adapted to receive a flange provided to a top portion of the container.

Preferably the collar comprises one or more further openings adapted to support one or more further containers.

BRIEF DESCRIPTION OF DRAWINGS

Further aspects of the present invention will become apparent from the following description which is given by way of example only and with reference to the accompanying drawings in which.

BRIEF DESCRIPTION OF PREFERRED EMBODIMENTS OF THE INVENTION

Figure 1:
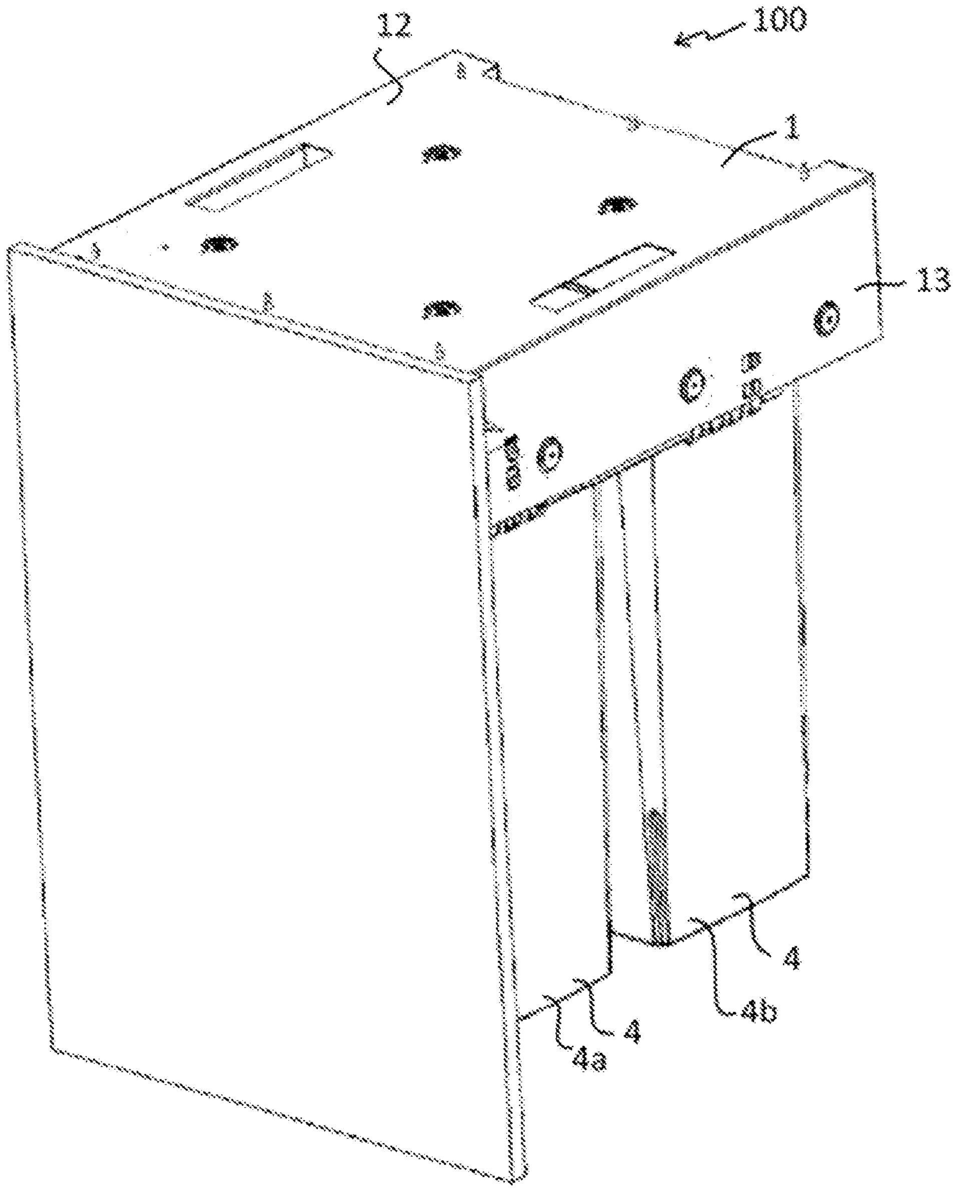
FIG. 1 is a perspective view of a container apparatus of the present invention with the frame in the first frame position.

Referring first to FIGS. 1 to 4, a container apparatus (more particularly a waste container apparatus) according to an aspect of the invention is generally referenced by arrow 100. The apparatus comprises a bracket 1 which serves as a mounting means for the apparatus, and a frame 2 which is slidably connected to the bracket 1 by a sliding mechanism 3, preferably by extendable runners 40, 41 such as are known to the art. The mounting means may be configured to mount the container apparatus in a cavity (not shown). The cavity may form part of kitchen, laundry or garage cabinetry, for example.

The frame 2 is adapted to support at least one container 4, preferably a waste container. In the embodiment shown in FIGS. 1 to 4, the frame 2 is adapted to support two containers 4*a*, 4*b*, with a first container 4*a* positioned in front of a second container 4*b*.

Figure 2:
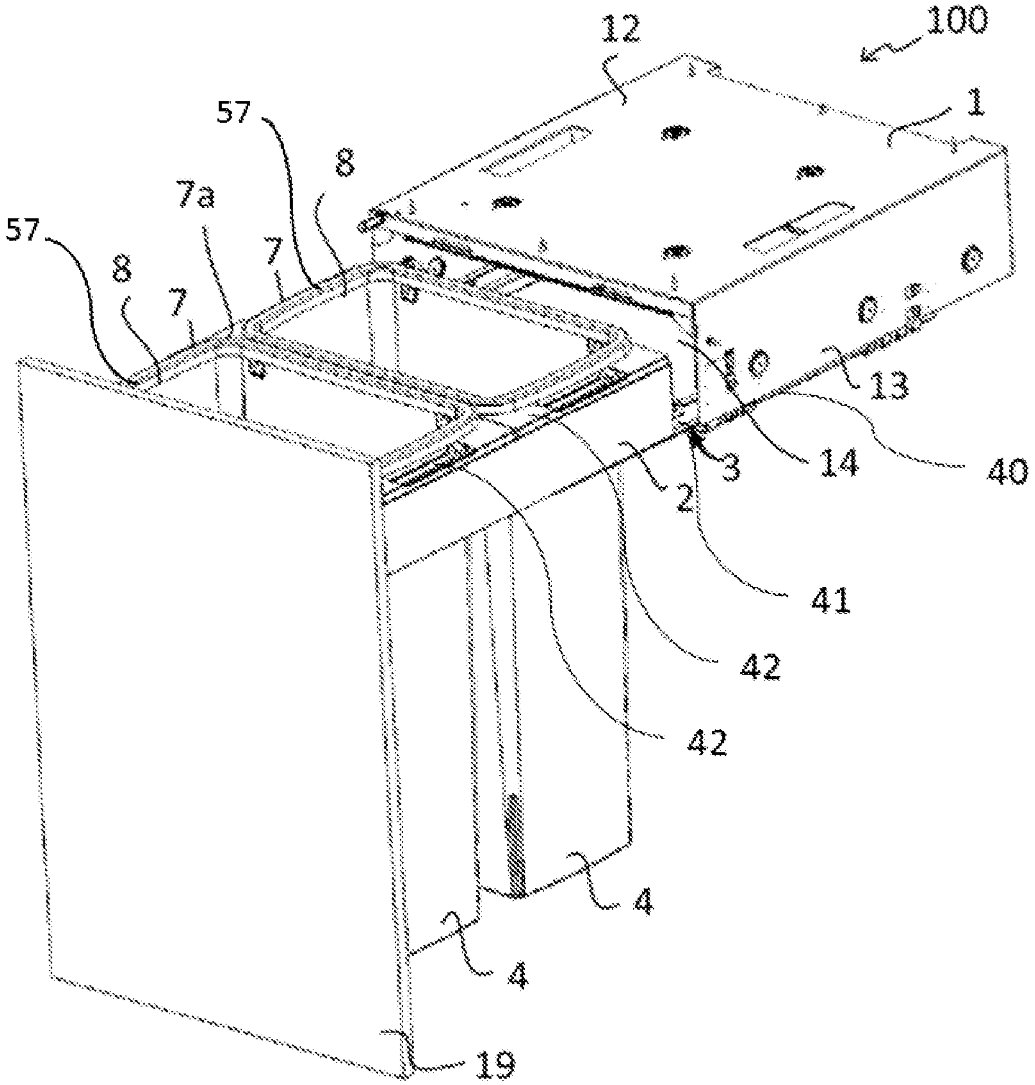
FIG. 2 is a perspective view of the container apparatus of FIG. 1 with the frame moved beyond the second frame position.

FIG. 2 is an isometric view of a retractable container apparatus 100 according to one embodiment of the invention. The retractable container apparatus 100 may comprise a front panel 19, sliding mechanism 3, and collars 42 as well as the bracket 1 and containers 4. FIG. 2 shows two collars 42 each supporting a container 4 between the extendable runners 40, 41 of the sliding mechanism 3 and behind front panel 19. The front panel 19 may be configured to cover the front of the cavity when the sliding mechanism 3 is retracted. The front panel 19 is mounted on the front end of the sliding mechanism 3 such that moving the front panel 2 outwards also extends the sliding mechanism 3, thereby in use pulling the containers 4 out of the cavity. The bracket 1 may be adapted to be mounted within the cavity, for example to the walls of the cavity, and supports the sliding mechanism 3.

In an alternative embodiment of the present invention (not shown), front panel 19 may not be attached to the sliding mechanism 3. Instead front panel 19 may be mounted by a hinge mechanism to a part of the cabinetry such that, when closed, the front panel 19 covers the front of the cavity and can be rotatably opened to expose the cavity. In this embodiment, as the front panel is not directly connected to the sliding mechanism 3, a handle may be provided to the retractable container apparatus 100 such that pulling the handle will result in pulling the containers 4 out of the cavity. The handle may be attached directly or indirectly to the sliding mechanism 3.

The sliding mechanism 3 of the embodiment in FIG. 2 comprises two laterally spaced runners, each runner being slidingly engaged with the bracket 1 on opposing sides of the cavity so that, in use, each runner is positioned adjacent each lateral wall of the cavity. Each runner comprises a stationary runner member 40 in sliding engagement with a moving runner member 41. The stationary runner member 40 is configured to be secured to the bracket 1 such that, when the retractable container apparatus 100 is opened, the stationary runner member 40 remains in a fixed position on the bracket 1. The moving runner member 41 is configured to be attached to front panel 19 such that, when the retractable container apparatus 100 is opened, the moving runner member 41 extends out of the cavity and supports the collar(s) 42 and container(s) 4. The sliding mechanism 3 may be hard to clean and may be difficult to remove from the retractable container apparatus 100.

Figure 3:
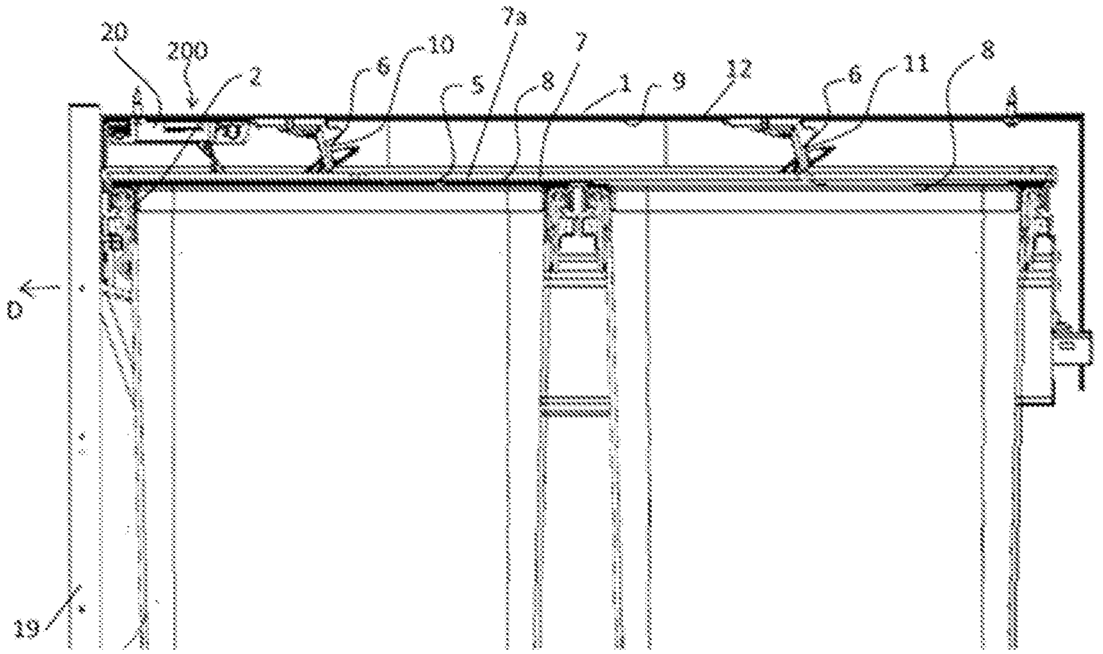
FIG. 3 is a partial cross-section side view of the apparatus of FIG. 1 with the frame in the first frame position.
Figure 4:
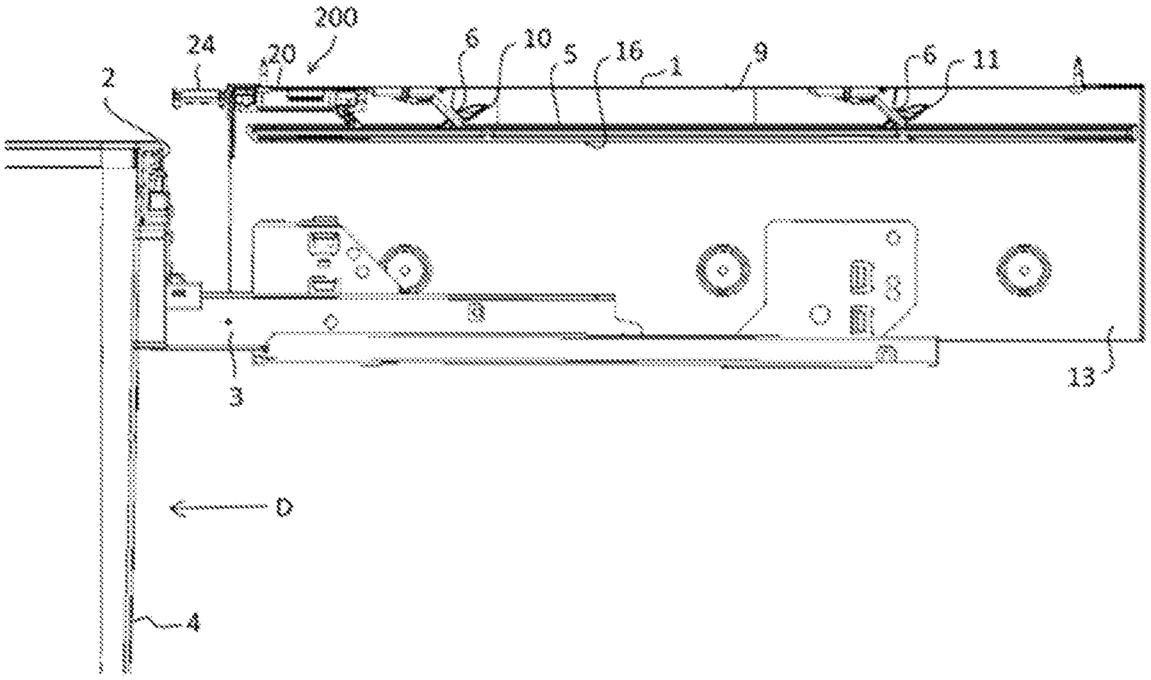
FIG. 4 is a partial cross-section side view of the apparatus of FIG. 1 with the frame in the position shown in FIG. 2.
Figure 8:
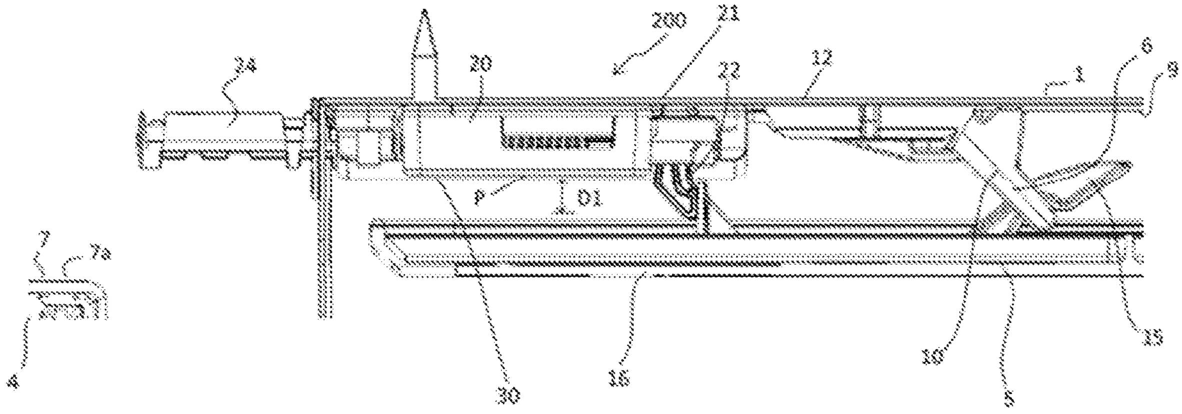
FIG. 8 is an enlarged cross-section side view of the apparatus of FIG. 1 showing the frame moved beyond the second frame position and the lid engaging means in the second lid engaging means position.

As best seen in FIGS. 3 and 4, the apparatus 100 comprises at least one lid 5 mounted to the bracket 1 by connecting means 6. The connecting means 6 are arranged such that the lid 5 can move from the first lid position (shown in FIGS. 3 and 6), wherein the lid 5 substantially covers the open end 8 of the container 4, and a second lid position (one example of which is shown in FIG. 8) wherein there is no contact between the lid and the waste container or the frame.

In the first position the lid 4 may contact an upper surface of the container 4 to cover the open end 8. However, in other embodiments the lid 5 may cover the open end 8 by contacting another member which is positioned on top of the container. For example, in the embodiment shown in the figures the lid covers the open end 8 by contacting a liner securing means 7 (in the form of a snap-fit collar in the embodiment shown) which is provided on top of the container 4 to hold a container liner (not shown) in position. Those skilled in the art will appreciate that such a liner securing means 7 (or any other member placed on top of the containers) can be considered to form part of the container 4, and references to the upper surface of the container include reference to the upper surface of the liner securing means 7.

The frame 2 is slidable between a first frame position (shown in FIG. 3) wherein the lid 5 completely covers an open end 8 of the waste container(s), and a second frame position (not shown) which is offset from the first position in a first direction D. In a preferred embodiment the offset is relatively small, for example around 10 mm-30 mm. FIG. 4 shows the frame 2 offset in the first direction D, but having moved beyond a preferred example of the second position, as is described further below. The frame 2 is slideable from the first frame position to a further frame position wherein the or each container 4 is at least partially uncovered so that items can be placed in the container(s). FIGS. 2 and 4 show an example of the frame 2 in such a further frame position.

Referring next to FIGS. 3 and 4 in particular, the connecting means 6 preferably comprise a plurality of arms which are rotatably connected to the lower surface 9 of an upper wall 12 of the mounting means/bracket 1. The connecting means 6 preferably comprise at least a first arm 10 and a second arm 11, wherein the first arm 10 is offset from second arm 11 in the first direction D. In preferred embodiments the first and second arms 10, 11 are arranged to form a parallelogram linkage with the lid 5, such that the lid 5 can swing upward and in an opposite direction to the first direction D when moving from the first lid position to the second lid position. In alternate embodiments, the first and second arms 10, 11 could be of different lengths such that the lid is tilted as it moves from the first lid position to the second lid position. In the embodiment shown the lid 5 is biased towards the first lid position by gravity. Those skilled in the art will appreciate that other mechanisms which allow movement upward and away from the first lid position are possible, for example sliding mechanisms. Some connecting means may allow movement to a second position which is upward and offset in direction D, rather than upward and offset in a direction opposite to direction D.

As can be seen from FIGS. 1 to 4, the bracket 1 preferably comprises an upper wall 12, side walls 13 and an open first end 14 from which the frame 2 extends when in the second frame position (and beyond). The opposite end of the bracket 1 may also be open. In alternative embodiments no bracket is provided and the internal surfaces of a cabinet may function as the mounting means.

The connection between the lid 5 and the connecting means 6 is preferably releasable, for example the connection may be by hook means 15 connected to the lid 5 (best seen in FIGS. 6, 8 and 10) which are adapted to engage hook receiving portions of the connecting means 6. This form of connection enables easy disconnection of the lid 5 from the connecting means 6 by lifting of the lid 5 and movement in the first direction D. In an alternative embodiment (not shown) the connecting means 6 may be provided with hook means which engage a suitable formation provided on the lid 5.

A lid moving means, generally referenced by arrow 200, is provided for moving the lid 5 to the second position when the frame 2 is moved from the first position to the second position (and beyond). In this way, when the frame 2 is moved to the second frame position, the lid 5 is lifted away from contact with the containers 4 (and the frame) so that the containers 4 can be slid out from beneath the lid 5 without the lid dragging on the upper surface 7*a* of the containers. This may reduce wear of the lid 5 and/or may allow the lower surface 16 of the lid 5 to be made of a resilient material which provides a good seal with the upper surface 7*a* of the containers 4. Moving the lid 5 so that it does not drag against the containers or other moving components may also make the frame easier to move back and forth than it would otherwise be, and may for example allow the use of "soft close", "self close" or "push to open" runner mechanisms such as are well known to those skilled in the art.

Many embodiments of lid moving means 200 are possible. For example, in one embodiment (not shown) an electrically powered lid moving means may comprise a sensing means (for example an optical or magnetic sensor) for sensing when the frame 2 moves from the first position to the second position, and an electrically operated actuator (for example a solenoid or a linear motor) to move the lid 5 from the first lid position to the second lid position. However, an alternative lid moving means 200 is described below with reference to FIGS. 5 to 13.

Figure 5:
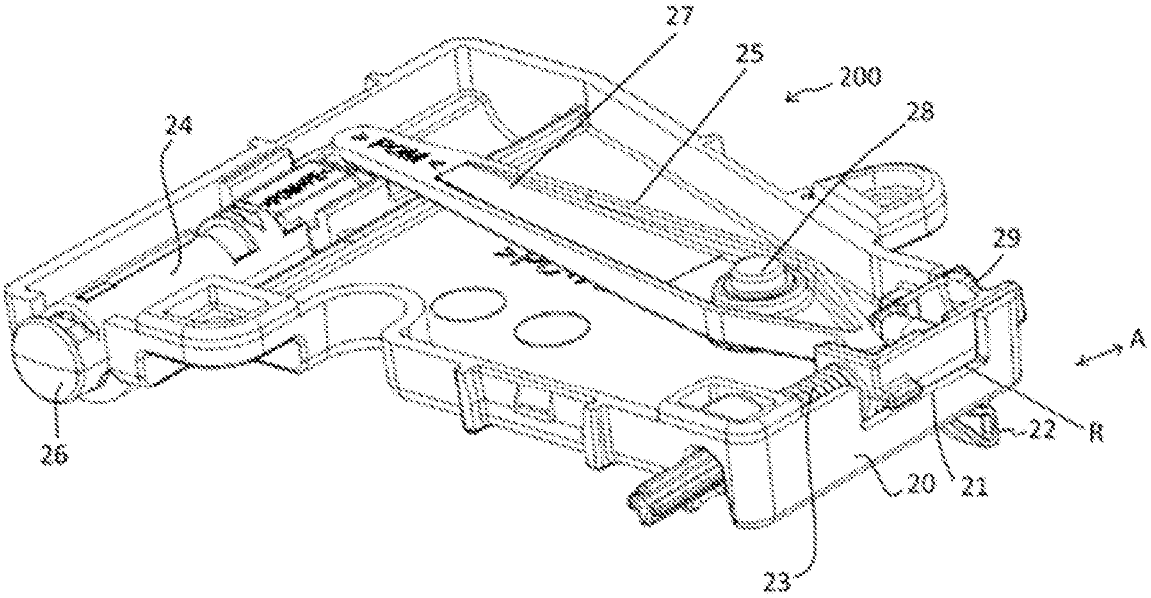
FIG. 5 is a perspective view of a lid moving means of the invention with an upper portion of the housing removed for clarity, and showing the lid engaging means in the first lid engaging means position.
Figure 6:
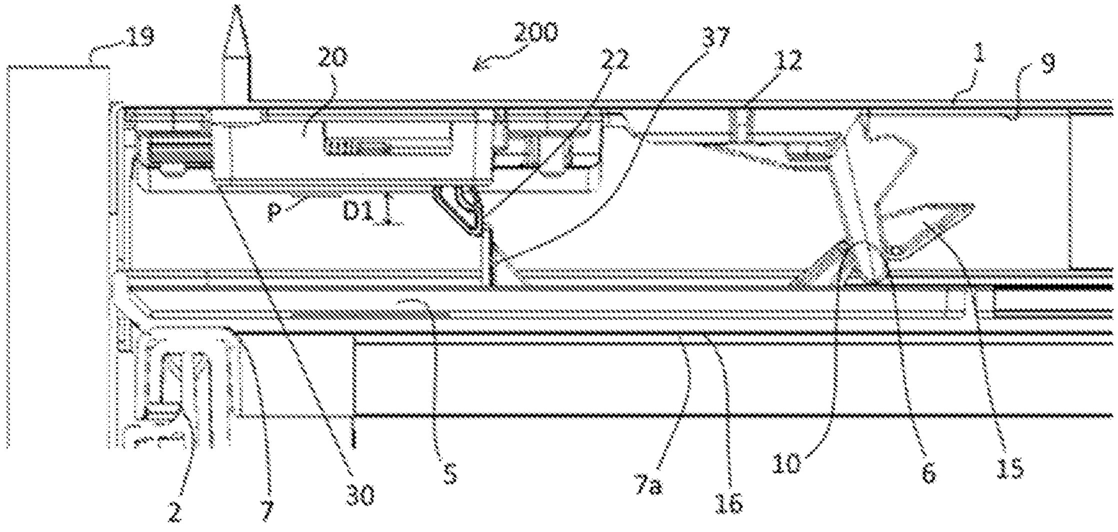
FIG. 6 is an enlarged cross-section side view of the apparatus of FIG. 1 showing the frame in the first frame position and the lid engaging means in the first lid engaging means position.

Referring first to FIGS. 5 and 6, a lid moving means 200 is generally referenced by arrow 200. The lid moving means 200 comprises a housing 20 which comprises a base for the lid moving means 200.

An actuation means 21 is provided which is slidably engaged with the housing 20. The actuation means comprises a lid engaging means 22 which, in use, abuts an upstanding portion 37 of the lid 5. The actuation means 21 is slidable between a first actuation means position, shown in FIGS. 5 and 6, and a second actuation means position, shown in FIGS. 7 and 8, which is offset from the first actuation means position in a direction opposite to direction D. As best seen in FIG. 8, in use, movement of the actuation means 21 to the second actuation means position moves the lid 5 to the second lid position. The actuation means 21 is preferably biased towards the second actuation means position by suitable biasing means such as a spring 23 which is positioned between an actuation member 29 and the housing 20.

The lid moving means 200 is provided with an abutment means 24 which acts as a frame position detection means and determines when the actuation means 21 moves from the first actuation means position to the second actuation means position.

Figure 7:
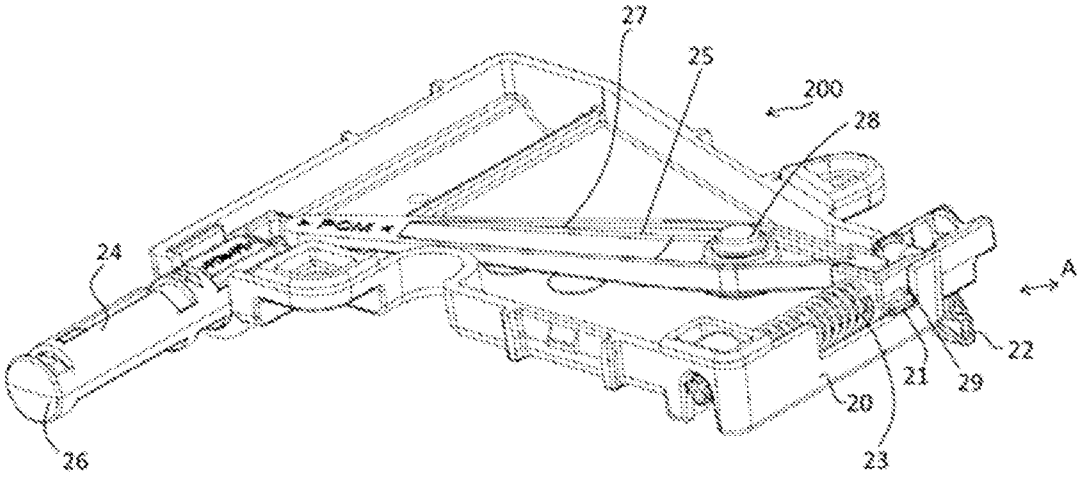
FIG. 7 is a perspective view of the lid moving means of FIG. 5 with the upper portion of the housing removed for clarity, and showing the lid engaging means in the second lid engaging means position.
Figure 9:
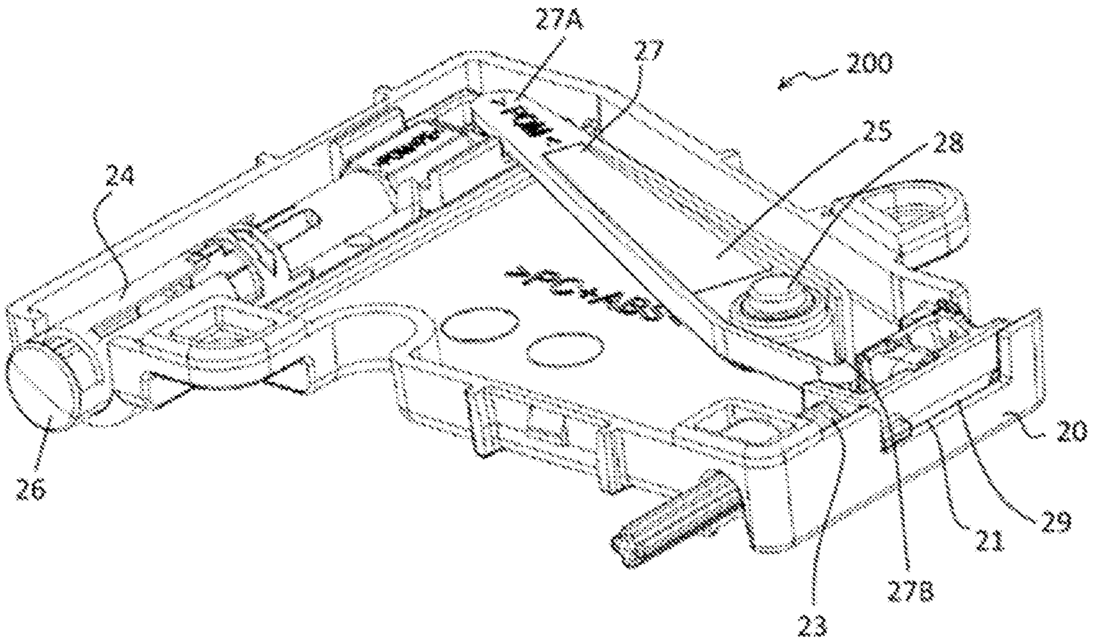
FIG. 9 is a perspective view of the lid moving means of FIG. 5 with the upper portion of the housing removed for clarity, and showing the lid engaging means in the third lid engaging means position.

Referring in particular to FIGS. 5, 7 and 9, the moving means 200 is provided with transmission means which cause movement of the actuation means 21 from the second actuation means position to the first actuation means position when the distal end 26 of the abutment means 24 is pushed towards the housing 20 by a portion of the frame 2 (or a part connected to or otherwise arranged to move with the frame such as a front panel 19). Releasing the abutment means 24 (for example by extending the frame or front panel 19 outwards) allows the actuation means to move to the second actuation means position under the action of the biasing means 23.

In the embodiment shown the transmission means 25 comprises a transmission member 27 which is engaged with the abutment means 24 at a first end 27A and engaged with the actuation means 21 at a second end 27B, and has a rotatable connection 28 to the housing 20 intermediate the first and second ends 27A, 27B. In the embodiment shown the distance between the second end 27B and the rotatable connection 28 is approximately % the total length of the transmission member 27, such that the actuation means 21 moves around 1 mm for every 3 mm of movement of the abutment means 24. Those skilled in the art will appreciate that alternative transmission means 25 may be used to cause movement of the actuation means 21 when the abutment means 24 is moved, for example a system of gears or the like.

In preferred embodiments the lid moving means 200 is arranged such that the lid engaging means 22 is moveable to a third position which does not abut the lid 5, for example when a user wishes to remove the lid 5 for cleaning or other purposes. As can be seen in FIGS. 5 and 7, in preferred embodiments movement of the actuation means 21 between the first actuation means position and the second actuation means position is substantially linear, and causes movement of the lid engaging means 22 along a first axis A. As shown in FIG. 9, movement of the actuation means 21 to the third actuation means position causes movement of the lid engaging means 22 to a third lid engaging means position which is offset from axis A.

Figure 10:
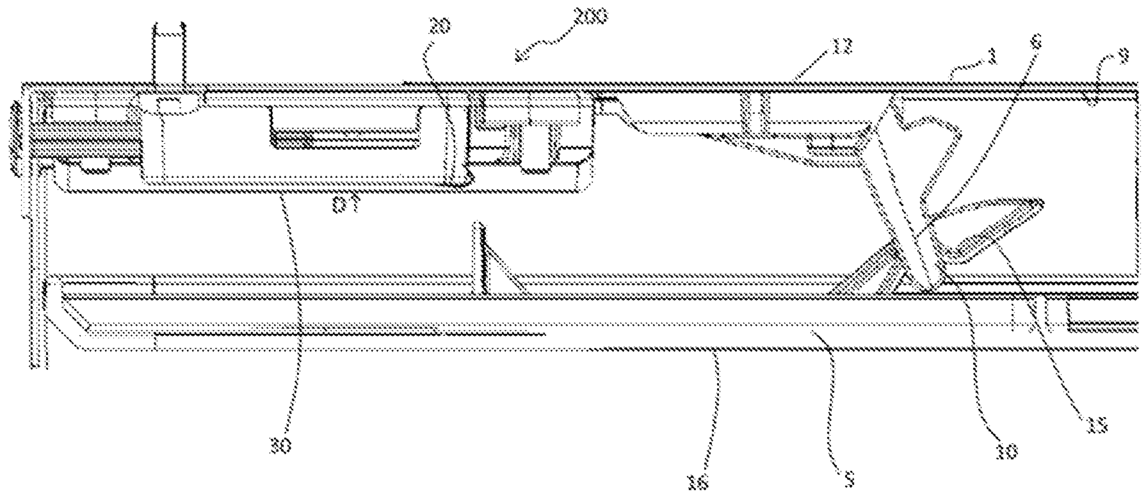
FIG. 10 is an enlarged cross-section side view of the apparatus of FIG. 1 showing the frame moved beyond the second frame position and the lid engaging means in the third lid engaging means position.

Referring next to FIGS. 6 and 8, in the embodiment shown, when the actuation means 21 is in the first actuation means position or the second actuation means position, the lid engaging means 22 protrudes from a plane P of a lower surface 30 of the housing 20 by a distance D1. However, as shown in FIG. 10, when the actuation means 21 is in the third actuation means position, the lid engaging means 22 extends from the plane by a distance D2 which is smaller than D1. In some embodiments distance D2 may be zero, that is, the lid engaging means 22 may not extend at all from the housing 20 when the actuation means 21 is in the third position. Disengaging the lid engaging means 22 from the lid 5 in this way may make it possible, or easier, to disengage the lid 5 from the connecting means 6, as is described above.

In the embodiment shown in FIGS. 5 to 11 the actuation means 21 comprises an actuation member 29, and the lid engaging means 22 is rotatably connected to the actuation member 29. The lid engaging means 22 is preferably biased towards the extended position shown in FIGS. 6 and 8. Movement of the actuation means 21 to the third actuation means position causes the lid engaging means 22 to come into contact with a lower wall of the housing 20, thereby causing the lid engaging means 22 to rotate around the rotational axis R (shown in FIG. 5) so that the lid engaging means 22 no longer protrudes from housing 20, or protrudes only a small distance. In alternate embodiments (not shown), the lid engaging means 22 may move so that it no longer protrudes from housing 20 by means other than rotation, for instance by sliding into the housing.

In preferred embodiments, the distal end 26 of the abutment means 24 enters the housing 20, or draws level with a protruding part of the housing 20, before the actuation means 21 extends significantly beyond the first actuation means position towards the third actuation means position. This prevents accidental movement of the actuation means 21 to the third actuation means position, which might result in accidental disengagement of the lid 5.

Figure 11:
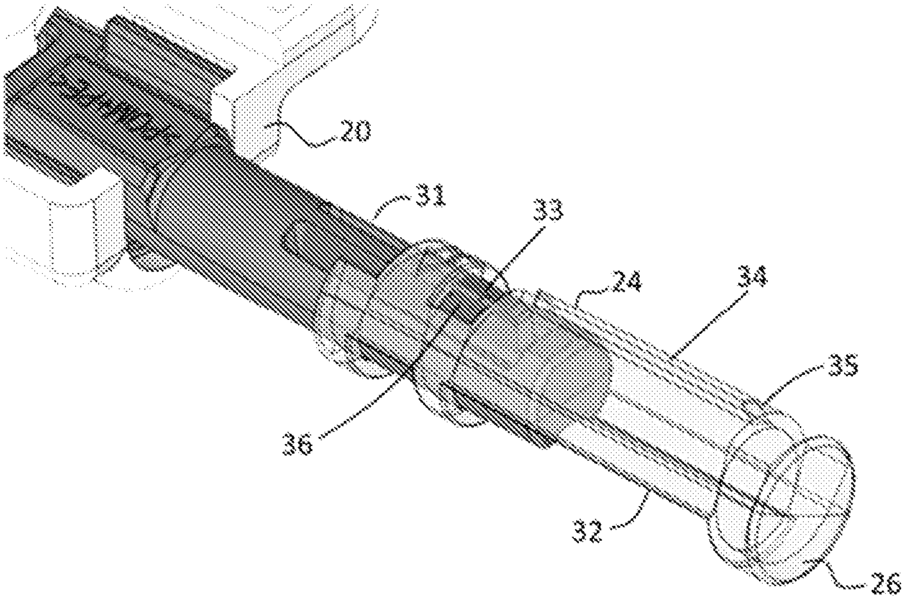
FIG. 11 is an enlarged perspective view of the abutment means of the moving means shown in FIG. 5 in an extended position.

The lid moving means 200 may be provided with a mechanism which allows movement of the actuation means 21 to the third actuation means position when required. Referring next in particular to FIGS. 7 and 11, in the embodiment shown the abutment means 24 has a normal configuration, shown in FIG. 7, and an extended configuration, shown in FIG. 11. Referring in particular to FIG. 11, the abutment means 24 comprises an inner member 31, which is connected to the transmission means 25, and an outer sleeve 32 which is rotatably and slidably connectable to the inner member 31. A side wall of the inner member 31 is provided with a protruding portion in the form of a pin or tab 33 which engages a slot 34 provided in the outer sleeve 32. The slot 34 has a first portion 35 which extends substantially parallel to a longitudinal axis of the inner member 31, and a second portion 36 which extends transversely from an end of the first portion 35 distal to the distal end 26 of the abutment means 24. To move the abutment means to the extended configuration the sleeve 32 is pulled outwardly (i.e. away from the housing) until the tab 33 reaches the end of the first portion 35 of the slot 34, and is then rotated such that the tab 33 engages the second portion 36 of the slot 34. In this extended position, the sleeve 32 can be used to push the inner member 31 beyond the point at which it enters the housing 20, and to the point at which the actuation means 21 moves to the third actuation means position. The sleeve 32 is preferably biased towards the normal configuration.

Those skilled in the art would appreciate that in alternative embodiments (not shown) the sleeve may be provided with an inwardly protruding tab and the inner member 31 with a corresponding slot. In yet another embodiment an outer sleeve may be connected to the transmission means and an inner member may be extended from the outer sleeve.

Figure 12:
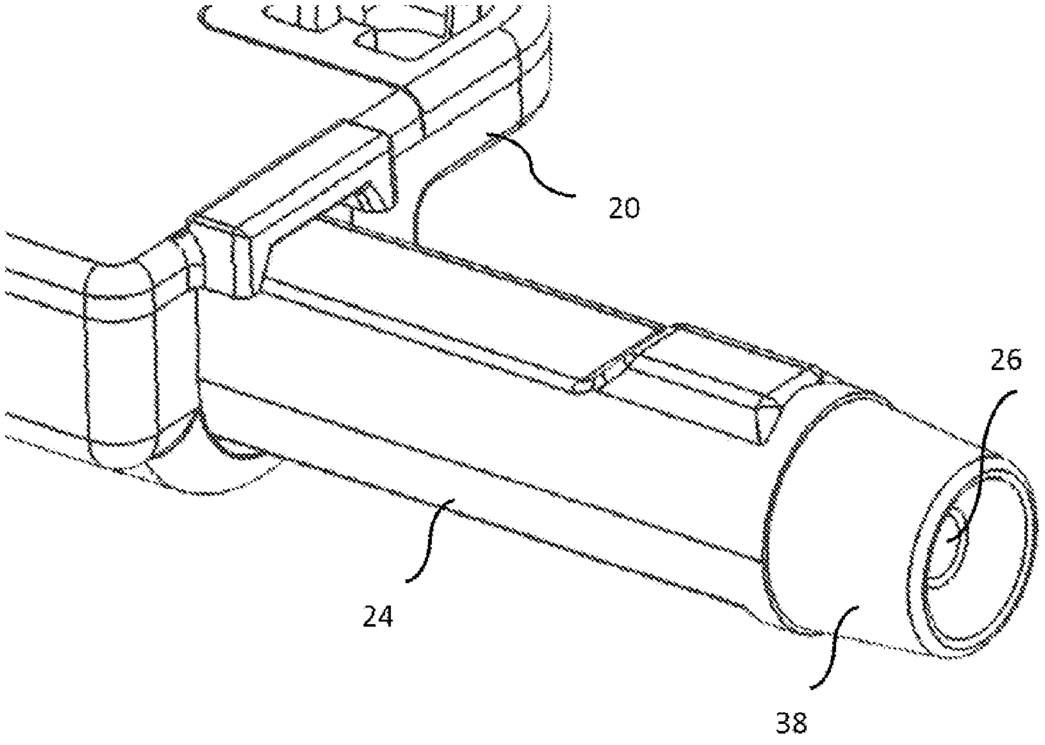
FIG. 12 is an enlarged perspective view of an alternate embodiment of the lid moving means.
Figure 13:
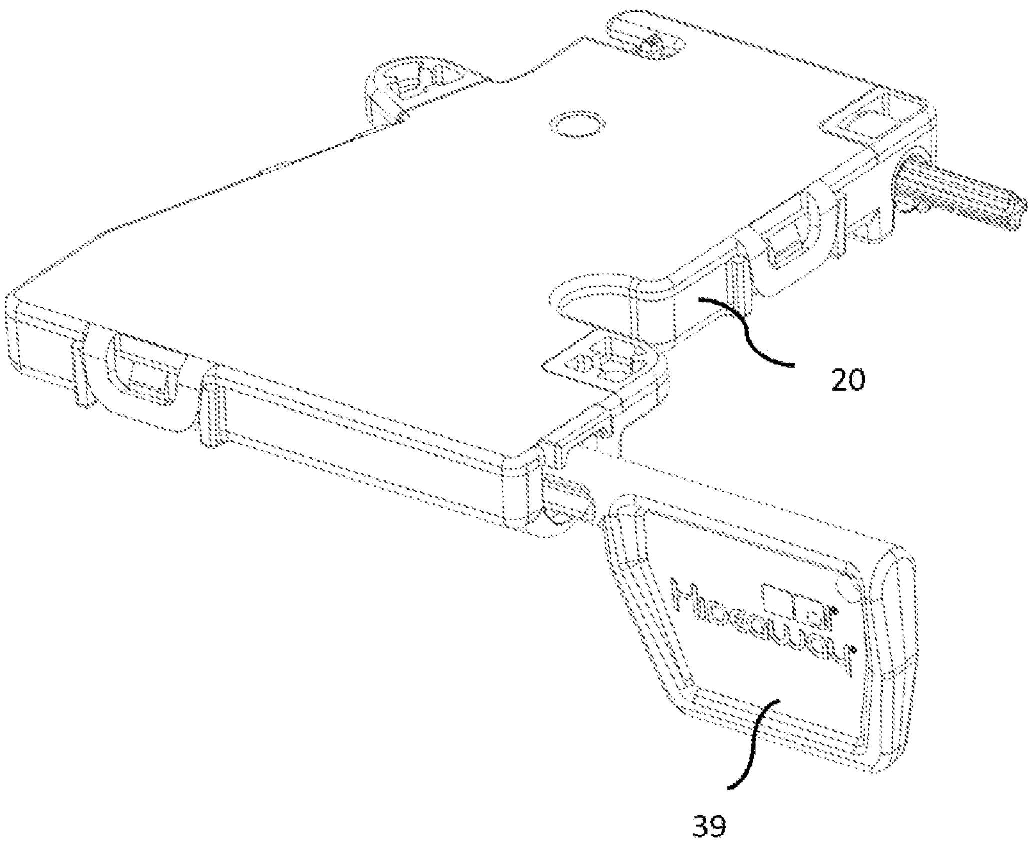
FIG. 13 is a perspective view of the lid moving means according to the embodiment of FIG. 12, showing a tool used to move the lid engaging means to the third lid engaging position.

In a further embodiment (not shown) the housing may be shaped to allow manual movement of the abutment means 24 to a position whereby the actuation means 21 extends beyond the first actuation means position to the third actuation means position. For example, a lower portion of the housing may be provided with a slot which allows access for a user's finger to push the distal end 26 of the abutment means 24 inside the housing 20 to cause the actuation means 21 to move to the third actuation means position. Alternatively, a special tool 39 may be provided to allow the abutment means 24 to be pushed inside the housing to a suitable position. As shown in FIG. 12, the end portion 38 of the abutment means 24 may be formed from a soft material, such as rubber, to lessen the noise when the front panel contacts the abutment means 24. The end portion 38 may also be shaped to receive an end of the special tool 39. In the embodiment shown in FIGS. 12 and 13, the end portion has a concave depression adapted to receive the end of the tool 39 in use.

Figure 14:
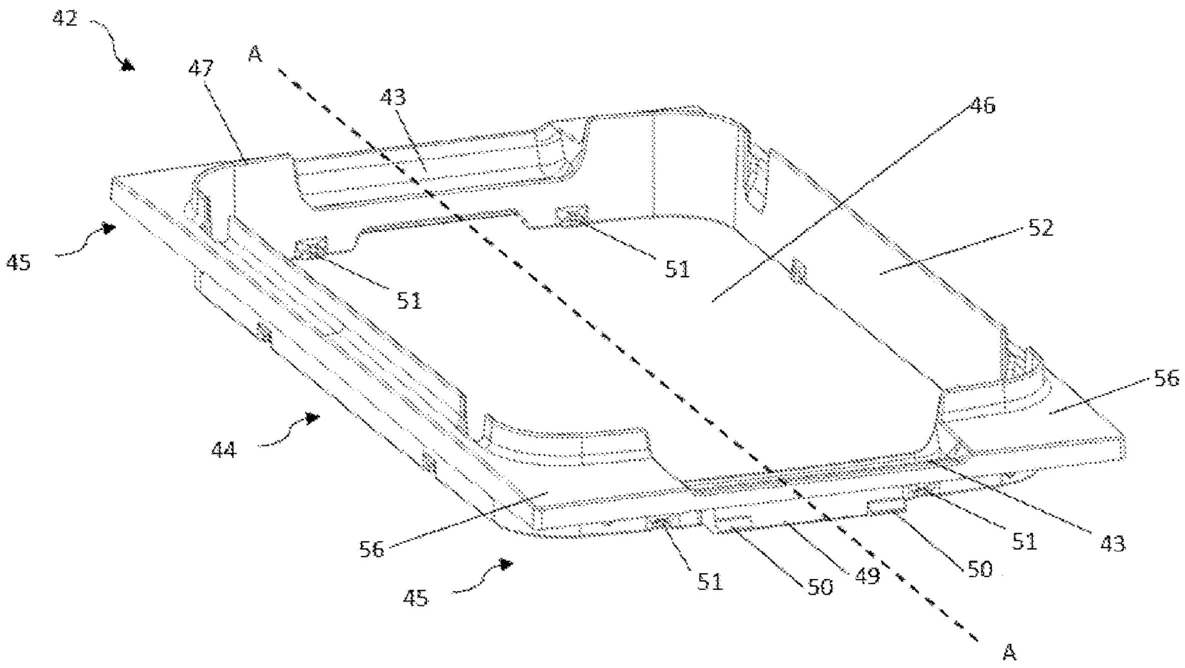
FIG. 14 is an isometric view of a collar according to an embodiment of the invention.
Figure 15:
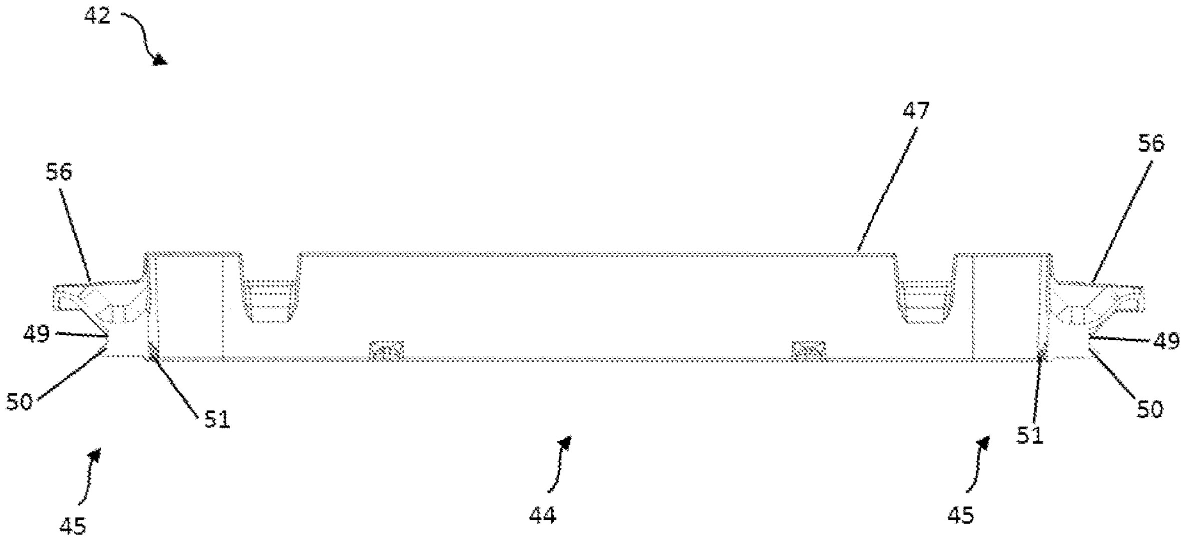
FIG. 15 is a cross-sectional view of the collar, along the line A-A of FIG. 14.

FIG. 14 is an isometric view of a collar 42 according to an embodiment of the invention and FIG. 15 is a cross-sectional view of the collar 42, along the line A-A of FIG. 14. Collar 42 is adapted to connect to the sliding mechanism 3 to support a container 4 between the runners. The collar 42 is adapted to be easily removed, preferably without the use of additional tools, from the retractable container apparatus 100, as is described further below.

The collar 42 may comprise three general portions: a body portion 44 and two wing portions 45. Each of the wing portions 45 are provided to opposing lateral sides of the body portion 44 (in the orientation of the collar when mounted in the retractable container apparatus 100), as shown in FIGS. 14 and 15.

The collar 42 defines opening 46, which is adapted to receive a container 4. The opening 46 may be positioned generally centrally in the collar 42 and may have a shape complementary to that of the container 4. The body portion 44 may at least partly define the collar opening 46 for the container 4. That is, the body portion 44 may entirely define the collar opening 46 or, as in the embodiment shown, the opening 46 may also be defined by the wing portions 45. The collar 42 may comprise one or more lift-out recesses 43, as shown in FIG. 14, in order that the container 4 may be easily removed from the apparatus 100. The lift-out recesses 43 may be provided in an upper surface of the collar 42 and may be of an appropriate size and shape such that a user can easily fit their fingers under an upper lip of a container which is supported by the collar to lift the container 4 up out of the collar 42.

In the embodiment shown in the figures the collar 42 comprises one or more raised edges or ridges 47 projecting upwardly from the body portion 44 around the perimeter of the opening 46 on one or more sides of the opening 46. The ridges 47 are adapted to aid in supporting the container 4 and ensure a secure fit between the container 4 and the collar 42. In the embodiment shown in FIG. 2, the container 4 has a flange 57 around the rim of the top of the container 4. This flange 57 is adapted to engage with the one or more ridges 47 on the collar 42. The flange 57 may comprise a lip which fits over the ridges 47, so holding the container 4 securely in place relative to the collar 42.

In alternative embodiments of the present invention (not shown), one or more collar opening recesses may be provided to the collar 42 around the opening 46. These collar opening recesses may have a shape complementary to that of the top of the container 4 and may be configured to receive the container 4 and hold it securely in place relative to the collar 42. In some embodiments of the invention, the container 4 has a flange 57 around its upper rim and the collar opening recesses may be configured to receive the flange 57 of the container 4. In such embodiments the collar opening recesses provide the advantage that, when the flange 57 of the container 4 is received in the collar opening recesses, the top of the container 4 may be flush with, or below the upper surface of the collar 42 around the collar opening recesses. This can ensure the container 4 does not interfere with the bracket 1 or other parts of the retractable container apparatus 100 that may be above the container 4. The collar opening recesses may also be configured to receive a handle on an upper part of the container 4, e.g. attached to the flange 57. This ensures that the handle (if provided) does not interfere with other parts of the retractable container apparatus 100 or obstruct the sliding mechanism 3 from closing.

Figure 17:
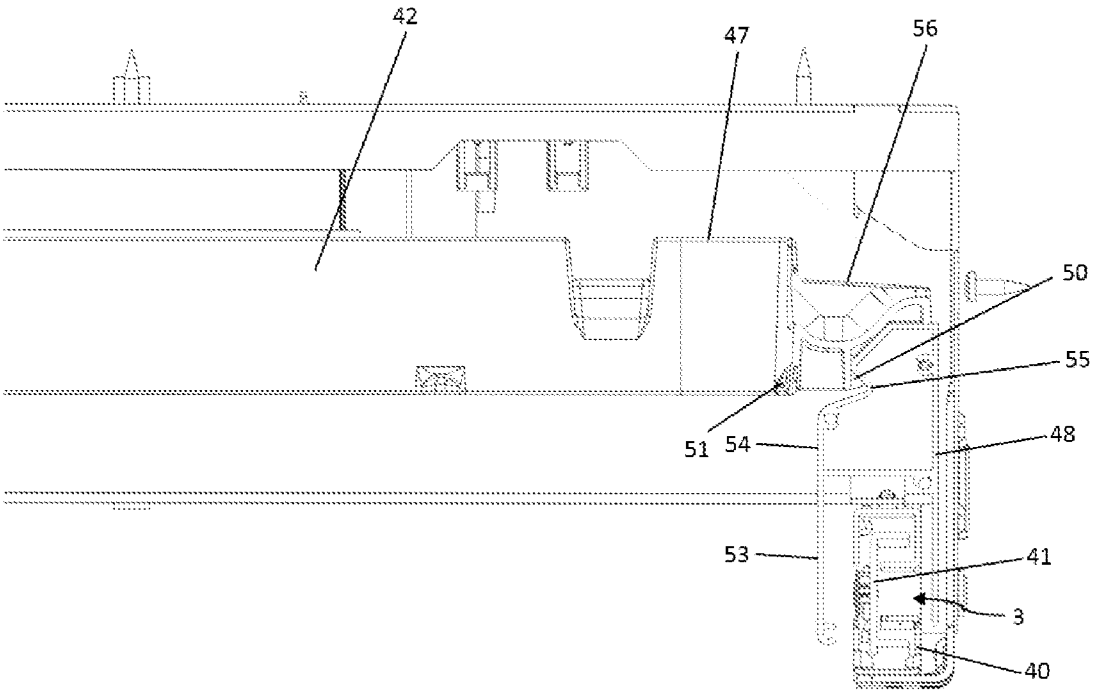
FIG. 17 is a magnified cross-sectional view of part of the system shown in FIG. 2.

In the embodiments illustrated, the wing portions 45 of collar 42 comprise a snap fit connector configured to connect the collar 42 directly or indirectly to the runners of sliding mechanism 3 via a snap fit connection. The collar 42 may be able to be lifted away from the sliding mechanism 3 by providing enough force to overcome the snap fit connection. In one example of the technology (not shown), the collar 42 connects directly to the moving runner members 41 of the sliding mechanism 3. In the alternative example of the technology shown in the figures, the collar 42 connects indirectly to the sliding mechanism 3 by connecting directly to a cover member 48, the cover member 48 being mounted on the moving runner member 41, as best seen in FIG. 17. In other embodiments, the collar 42 may directly connect to some other intermediate component(s) which is/are attached to the moving runner members 41 of sliding mechanism 3. It will be appreciated that the principles of the snap fit connection described herein between the collar 42 and cover member 48 may be applied to these other embodiments.

The snap fit connection between the collar 42 and the sliding mechanism 3 may comprise one or more snap fit connectors on an outer surface 49 of the collar 42, for example on an outer lateral surface facing the sliding mechanism 3, and a structure on the sliding mechanism 3 configured to receive the snap fit connectors such as is described below. In the embodiment shown in the figures a snap fit connector is provided on each of the wing portions 45, to connect both wing portions 45 to the sliding mechanism 3. In an alternative embodiment, a snap fit connector is provided to only one of the wing portions 45.

In one form of the technology, as shown in FIGS. 14 and 15, the snap fit connectors comprise one or more protrusions 50 on the outer lateral surface 49 of the wing portions 45. In the embodiment shown, two protrusions 50 are spaced along each outer lateral surface 49 of the wing portions 45. The protrusions 50 comprise an upper sloping surface and a horizontal lower surface. The collar 42 may further comprise one or more projections 51 on the inner surface 52 of the opening 46 of the body portion 44. Projections 51 may be provided on opposing lateral sides of the opening 46. In the embodiment shown in FIG. 14 the projections 51 are positioned and arranged so that, when the container 4 is placed in the opening 46, the container 4 contacts the projections 51. When the container is placed in the opening 46 the sides of the container 4 inhibit the inward movement (for example by flexure) of portions of the collar 42 around opening 46. This inhibits the protrusions 50 of the snap fit connectors from moving inwardly and therefore disengaging with the snap fit connector portion to which it connects. This keeps the collar 42 securely in place in use when a container is mounted to the collar.

Figure 18:
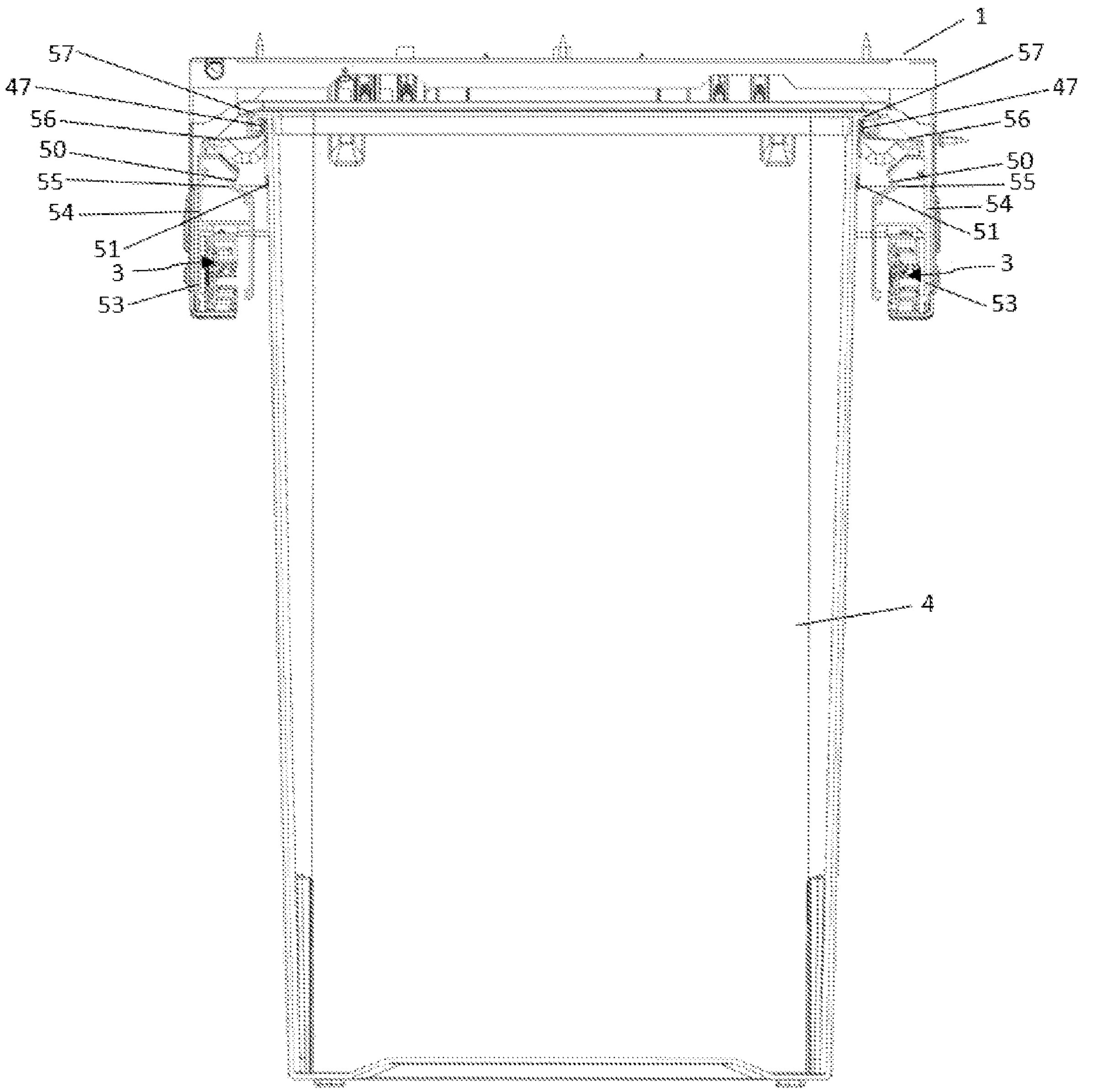
FIG. 18 is a further cross-sectional view of the retractable container system shown in FIG. 2.

In an alternative embodiment (not shown) of the invention the container 4 and collar 42 are structured and configured such that, when the container 4 contacts the projections 51, the protrusions 50 of snap fit connectors are urged in an outward lateral direction. For example, the body portion 44 may be deformed, thus pushing the protrusions outwardly. The container 4 may be configured to be tapered such that the outer perimeter at the top of the container 4 is larger than the outer perimeter at the base of the container 4, as shown in FIG. 18. This makes it easier to place the bottom of the container 4 in the opening 46 and, as the container 4 is lowered into the collar 42, the sides of the container 4 come into contact with the projections 51. As the container 4 is lowered further into the collar 42 the body portion 44 is deformed as explained above. The collar 42 may be constructed of a deformable material, for example a plastics material, so that it can deform in the manner described. Tapered containers may also be used with any of other embodiments of the collar described above.

Figure 16:
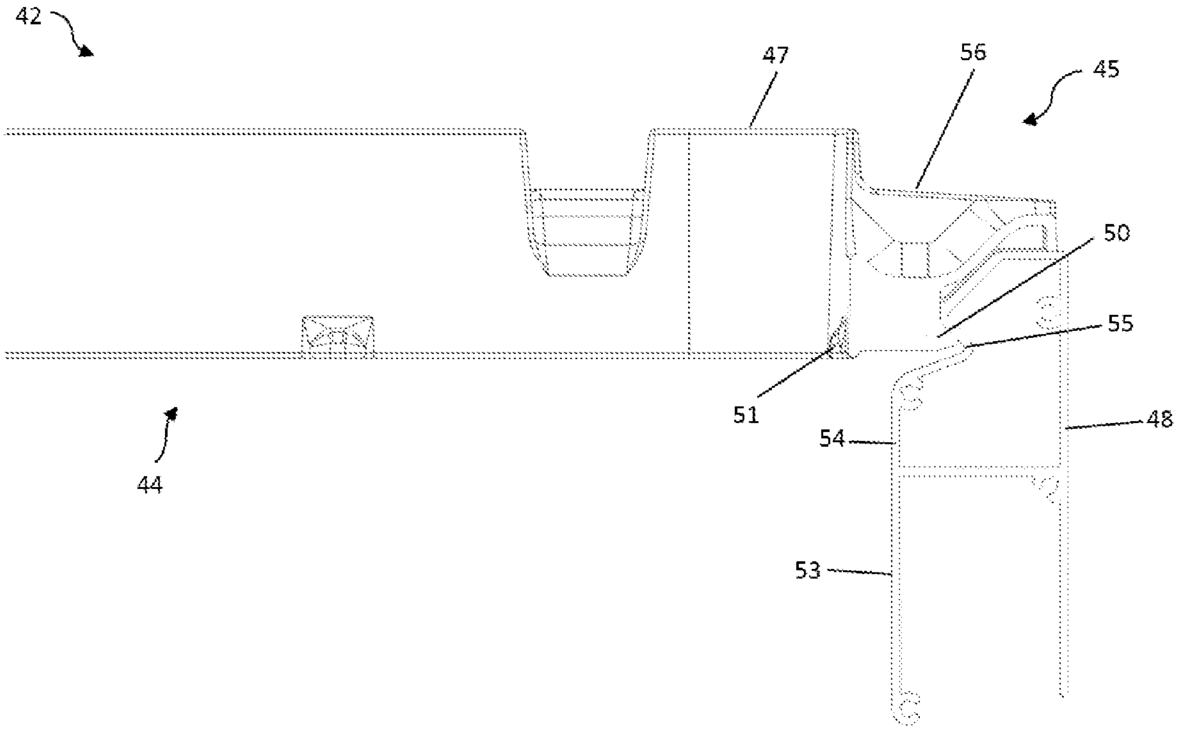
FIG. 16 is a magnified cross-sectional view of part of the collar and cover member of the system shown in FIG. 2.

In some forms of the present technology, a cover member 48 may be provided to each of the moving runner members 41 of the sliding mechanism 3. For example, the cover member 48 may be mounted to the respective moving runner member 41 along a substantial part of its length. The cover member 48 may be configured to cover the sliding mechanism 3, as shown in FIG. 17, which helps in preventing dirt accumulating on or around the runners. As shown in FIG. 16, the cover member 48 may comprise two portions: a runner cover portion 53 which is generally inverted u-shaped and covers the runners; and a snap fit connector portion 54 which is provided above the runner cover portion 53 and is configured to connect to the collar 42 in a snap fit connection. The cover member 48 may be formed from any suitable material, such as aluminium, roll formed steel, plastic or wood.

The snap fit connector portion 54 of cover member 48 may comprise one or more grooves 55 configured to receive the protrusion(s) 50 of the wing portion 45 of collar 42. The groove 55 may have a shape complementary to that of the protrusion 50 to assist this engagement. FIG. 16 is an enlarged cross-sectional view of part of the collar 42 and cover member 48 of the apparatus shown in FIG. 2. As shown, the cover member 48 has a groove 55 with two sloping surfaces, the upper sloping surface being on the same angle as the upper surface of the protrusions 50 to provide a firm engagement between these components when the upper surface of the groove 55 contacts the upper surface of the protrusions 50. In other forms of the technology, the groove 55 may be provided directly to the moving runner member 41, therefore having a direct connection between the sliding mechanism 3 and the collar 42.

FIG. 17 is an enlarged cross-sectional view of part of the apparatus shown in FIG. 2. As shown, the cover member 48 covers the sliding mechanism 3 and is connected to the collar 42 via the snap fit connection. The cover member 48 may be configured to attach to the sliding mechanism 3 such that it moves concurrently with the sliding mechanism 3.

As shown in FIGS. 16 and 17 the collar 42 may be configured to cover at least a part of the sliding mechanism 3, for example the moving runner members 41. The wing portions 45 may comprise cover portions 56 extending laterally outwardly from body portion 44. When the collar 42 is fitted to the sliding mechanism 3, the cover portions 56 may be configured to cover parts of the sliding mechanism 3, for example those parts that are exposed during opening of the retractable container apparatus 100, thereby preventing or hindering accumulation of dirt and dust. The cover portions 56 may directly cover the sliding mechanism 3 or alternatively indirectly cover the sliding mechanism 3, for example by covering cover member 48 which is mounted on the moving runner members 41, as shown in FIG. 17. The cover portions 56 preferably comprise a substantially planar upwardly facing surface, which may be easily cleaned.

In a preferred embodiment of the invention, when the collar 42 is fitted to the sliding mechanism 3 via the snap fit connection, the snap fit connection is fully engaged, i.e. the snap fit connector or protrusions 50 are substantially fully interlocked with the complementary grooves 55. In this position the protrusions 50 may be securely fitted and may not move any further laterally outwardly. When the container 4 is fitted into the collar 42 it contacts the projections 51. This contact prevents the snap fit connection from disengaging by inhibiting the collar 42, and therefore the snap fit connector or protrusions 50, from moving inwardly (i.e. towards opening 46) and disconnecting from the grooves 55. This aids in ensuring the protrusions 50 remain in secure contact with the grooves 55.

As has already been described, in some embodiments when the container 4 is fitted into the collar 42 it contacts the projections 51 which deforms the wing portions 45 and therefore the one or more protrusions 50 of the snap fit connection are urged in an outward lateral direction into the complementary groove 55 of the cover member 48, so further securing the position of the collar 42. FIG. 18 is a further cross-sectional view of the retractable container system shown in FIG. 2. As shown in FIG. 18, when the projections 51 are in contact with the container 4, the protrusions 50 of the snap fit connection are pushed outwardly into the groove 55. This may increase the area of contact between the upper side of the protrusion 50 and the upper side of the groove 55 and/or the degree of interlock between the components of the snap fit connection, thereby increasing the engagement and the strength of the snap fit connection. A stronger connection between the collar 42 and the sliding mechanism 3 results in less movement of the collar and therefore less noise caused by movement of the collar when the retractable container apparatus 100 is opened and closed.

In some forms of the technology, the opening 46 of the collar 42 may be of a size complementary to that of the container 4 such that, when the container 4 is placed in the opening 46, the sides of the container contact the area of the collar 42 forming the opening 46. This contact prevents the snap fit connection from disengaging in a similar manner to that described above. In these forms of the technology it may not be necessary to have projections 51 on the collar 42, as the shape and size of the collar 42 enables contact between the container 4 and the collar 42 to prevent the snap fit connection from disengaging.

In another form of the technology, the opening 46 of the collar 42 may be of a size that is slightly smaller than the perimeter of container 4 such that, when the container 4 is fitted in the opening 46, the opening 46 is deformed and wing portions 45 are urged in an outward lateral direction, strengthening the snap fit connection in a similar manner to that described above. In these forms of the technology it may not be necessary to have projections 51 on the collar 42, as the shape and size of the collar 42 would achieve a similar enhancement of the snap fit connection.

The collar 42 may be removed from the retractable container apparatus 100 by releasing the snap fit connection. The snap fit connection may be released by pulling the collar 42 inwardly at the edges of the opening 46 to disengage the snap fit connector or protrusion 50 from the groove 55. Alternatively, the collar 42 may be able to be twisted to remove it. The easy removal of the collar 42 assists with cleaning the collar and also enables the collar 42 to be placed in a dishwasher or other automatic washing or sanitizing machine. The collar is therefore easily and quickly cleaned and maintained.

In other forms of the technology, the collar 42 may have more than one opening 46 and may be configured to support more than one container 4. In other forms of the technology, as shown in FIG. 2, multiple collars 42 may be configured to be mounted on the same sliding mechanism 3, each supporting a container 4. In such forms the collar or collars together may be configured to substantially cover the sliding mechanism 3 to protect the sliding mechanism 3 from accumulating dirt. In the embodiment shown in FIG. 2, two collars 42 are adjacent to each other and both are supported by the sliding mechanism 3. One of the collars 42 is positioned adjacent to the front panel 19, the other collar being positioned directly behind. This enables the containers 4 to be suspended longitudinally adjacent within the cavity. Alternative embodiments may use different configurations of multiple collars 42, depending on the desired design and layout of the containers.

In one example the retractable container apparatus 100 may be provided in a kitchen and container 4 may be used for storing waste. In other examples, container apparatus 100 may be provided in a garage and containers 4 may be used for storing laundry or other items.

In other embodiments of the technology another elongate member may be used in place of the cover member 48 of the illustrated embodiments. That is, embodiments of the technology are not limited to this component being formed from an extruded length of material.

In some embodiments of the technology the snap fit connection may comprise a groove provided to the collar 42 and a protrusion 50 provided to the moving runner member 41 or cover member 48 (i.e. the 'male' and 'female' members of the snap fit connection are swapped around from the embodiment described with reference to the figures). The snap fit connection would still work in a similar method as described above to connect the collar 42 to the retractable container apparatus 100. Alternative embodiments may use other forms of snap fit connection.

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

The invention may also be said broadly to consist in the parts, elements and features referred to or indicated in the specification of the application, individually or collectively, in any or all combinations of two or more of said parts, elements or features.

Aspects of the present invention have been described by way of example only and it should be appreciated that modifications and additions may be made thereto without departing from the scope thereof.

What is claimed is:

1. A collar for mounting a container between laterally spaced runners of a retractable container apparatus, the collar comprising:

a body portion; and two wing portions, the wing portions being provided to opposing lateral sides of the body portion, each wing portion comprising a snap fit connector configured to connect directly or indirectly to a respective runner in a releasable snap fit connection, the snap fit connector of each wing portion provided on an outer lateral surface of the wing portion, wherein the snap fit connector comprises protrusions that are spaced apart along the outer lateral surface of the wing portion;

wherein the body portion at least partly defines an opening configured, in use, to receive the container so that a bottom of the container passes completely through the opening and the container is supported between the runners, wherein the opening extends through both an upper side and a lower side of the collar, and wherein positioning the container within the opening substantially inhibits inward movement of the snap fit connector;

wherein the collar comprises a first set of spaced apart projections, the first set of spaced apart projections projecting from the body portion into the opening on a first lateral side of the opening for contacting the container when the container is positioned in the opening; and wherein the first set of spaced apart projections and the snap fit connector are formed on opposing side surfaces of each of the two wing portions.

2. The collar of claim 1, wherein at least one of the wing portions partially defines the opening.

3. The collar of claim 1, wherein deformation of the body portion causes the snap fit connectors to be urged in the outward lateral direction.

4. The collar of claim 1, wherein the collar comprises a second set of spaced apart projections, the second set of spaced apart projections projecting from the body portion into the opening on a second lateral side of the opening, the second lateral side of the opening opposing the first lateral side of the opening, wherein, the second set of spaced apart projections is for contacting the container when the container is positioned in the opening.

5. The collar of claim 1, wherein the wing portions comprise cover portions configured to substantially cover at least a part of the runners when the collar is connected to the runners.

6. The collar of claim 5, wherein the cover portions comprise substantially planar surfaces which are configured in use to face upwards.

7. The collar of claim 1, wherein the collar comprises at least one ridge which in use projects upwards from the body portion on at least one side of the opening.

8. The collar of claim 1, wherein the collar comprises one or more further openings adapted to support one or more further containers.

9. A container apparatus comprising:

two laterally spaced runners configured to be mounted in a cavity;

a collar according to claim 1;

a container configured, in use, to be received by the collar; and a mount for mounting the container apparatus.

10. The container apparatus according to claim 9, wherein a front panel is mounted in front of the runners such that, when the runners are retracted into the cavity, the front panel substantially closes the cavity.

11. The container apparatus of claim 9, wherein when the container is received by the opening, inward movement of the snap fit connectors is substantially inhibited.

12. The container apparatus of claim 9, wherein the opening is sized relative to the container so that, when the container is received by the opening, the snap fit connectors are urged in an outward lateral direction.

13. The container apparatus of claim 9, wherein a cover member is provided along each of the runners, wherein the cover member is configured to cover moving runner members of the respective runners.

14. The container apparatus of claim 13, wherein the cover members provide a smooth surface which in use faces upwards and is easy to clean.

15. The container apparatus of claim 13, wherein the protrusions of each snap fit connector are adapted to snap fit into a complementary groove of a respective one of the cover members.

16. The collar of claim 1, wherein contact between the container and the first set of spaced apart projections urges the snap fit connector in an outward lateral direction.

* * * * *